(12) United States Patent
Bradlow et al.

(10) Patent No.: US 11,352,091 B2
(45) Date of Patent: Jun. 7, 2022

(54) CREATING EASY-TO-UNDERSTAND INDICATIONS OF A VEHICLE STATE

(71) Applicant: Neutron Holdings, Inc., San Francisco, CA (US)

(72) Inventors: Henry W. Bradlow, San Francisco, CA (US); Hung Yui Lo, San Francisco, CA (US); Houchang Lu, San Francisco, CA (US); Yang Song, San Francisco, CA (US); Meng Xie, San Francisco, CA (US); Peter Chang, San Francisco, CA (US); Xiaoxiao Hou, San Francisco, CA (US); Punit Nitin Shah, San Francisco, CA (US); Siwei Wang, San Francisco, CA (US)

(73) Assignee: Neutron Holdings, Inc., San Francisco, CA (US)

( * ) Notice: Subject to any disclaimer, the term of this patent is extended or adjusted under 35 U.S.C. 154(b) by 0 days.

(21) Appl. No.: 16/559,983

(22) Filed: Sep. 4, 2019

(65) Prior Publication Data

US 2020/0122802 A1 Apr. 23, 2020

Related U.S. Application Data

(60) Provisional application No. 62/747,098, filed on Oct. 17, 2018.

(51) Int. Cl.
*B60Q 1/00* (2006.01)
*B62K 3/00* (2006.01)
(Continued)

(52) U.S. Cl.
CPC ............... *B62K 3/002* (2013.01); *B62J 6/015* (2020.02); *B62M 6/60* (2013.01); *G09G 5/003* (2013.01);
(Continued)

(58) Field of Classification Search
CPC ...... B60Q 1/00; F21W 2102/00; B62K 3/002; B62J 6/015; B62M 6/60; G09G 5/003
(Continued)

(56) References Cited

U.S. PATENT DOCUMENTS

| | | | |
|---|---|---|---|
| 5,838,259 A * | 11/1998 | Tonkin | B60Q 1/54 340/903 |
| 2012/0206050 A1 * | 8/2012 | Spero | H05B 3/008 315/152 |

(Continued)

*Primary Examiner* — Brent Swarthout
(74) *Attorney, Agent, or Firm* — Dentons US LLP

(57) ABSTRACT

Presented here is a system and method for creating easy-to-understand notifications of the vehicle state. The notification can be visual or can be auditory and can indicate to the user the vehicle state even when the user's attention is directed elsewhere. The indication can serve to attract the user's attention before more involved information is presented to the user, such as text, or the indication can serve to communicate to the user the vehicle state in an easy-to-understand way such as using color-coded displays or audio indications. The intensity of the indication can be adjusted based on the likelihood that indication will be perceived by the user by, for example, measuring ambient light and/or ambient noise. Reducing the intensity of the indication conserves energy of an energy source associated with the vehicle.

9 Claims, 13 Drawing Sheets

(51) Int. Cl.
  *B62M 6/60* (2010.01)
  *G09G 5/00* (2006.01)
  *B62J 6/015* (2020.01)
  *B62J 45/20* (2020.01)
  *B62J 50/20* (2020.01)

(52) U.S. Cl.
  CPC ............. *B62J 45/20* (2020.02); *B62J 50/20* (2020.02); *B62K 2202/00* (2013.01)

(58) Field of Classification Search
  USPC ......................................................... 340/432
  See application file for complete search history.

(56) References Cited

U.S. PATENT DOCUMENTS

| | | | | |
|---|---|---|---|---|
| 2015/0330109 | A1* | 11/2015 | Tepper | B62H 3/08 700/237 |
| 2016/0023636 | A1* | 1/2016 | Keating | B60R 25/20 701/2 |
| 2017/0048615 | A1* | 2/2017 | Son | H03G 3/32 |

* cited by examiner

| Lock State 500 | Other State 510 | Screen 520 | Indicator State 530 |
|---|---|---|---|
| Unlocked | • Hardware error<br>• Low battery<br>• Short-stopped<br>• Any CCE zone<br>   ∘ Riding<br>   ∘ Parking<br>   ∘ Slow<br>• Stopped for e.g., >10 sec | Screen I | Pulsing Red |
| Unlocked | • Low battery<br>• Short-stopped<br>• Any CCE zone<br>   ∘ Riding<br>   ∘ Parking<br>   ∘ Slow<br>• Stopped for e.g., >10 sec | Screen E | Pulsing Yellow |
| Unlocked | • Short-stopped<br>• Any CCE zone<br>   ∘ Riding<br>   ∘ Parking<br>   ∘ Slow<br>• Stopped for e.g., >10 sec | Screen C | Pulsing Green |
| Unlocked | • CCE zone<br>   ∘ No Riding<br>• Speed > 0 mph<br>560 | Screen J2 | Pulsing Yellow |
| Unlocked | • CCE zone<br>   ∘ No Parking<br>• Stopped for e.g., >10 sec<br>550 | Screen J1 | Pulsing Yellow |
| Unlocked | • *CCE zone*<br>   ∘ *Slow 5mph*<br>• *Speed > 5 mph*<br>570 | Screen J3 | Pulsing Yellow |
| Unlocked | • Stopped for e.g., >10 sec | Screen F | Pulsing Yellow |
| Unlocked | No other states active. | Screen D | Pulsing Green |
| Locked | • OTA in progress<br>• Charger plugged in<br>• Maintenance mode<br>• Locked e.g. <5 sec ago | Screen K | Pulsing Red |
| Locked | • Charger plugged in<br>• Maintenance mode<br>• Locked e.g. <5 sec ago | Screen H | Pulsing Yellow |
| Locked | • Maintenance mode<br>• Low battery<br>• Locked e.g. <5 sec ago | Screen B | Solid Red |
| Locked | • Low battery<br>• Locked e.g. <5 sec ago | Screen B | Solid Yellow |
| Locked | • Locked e.g. <5 sec ago | Screen G | Solid Green |
| Locked | Available | Screen A | Solid Green |

*Fig. 5*

| Name | Brightness | When | Mock |
|---|---|---|---|
| Screen A | 10% | Before trip - available for ride | 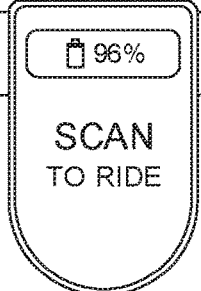 |
| Screen B | 10% | Maintenance mode OR Low battery |  |
| Screen C | 100% | Reserved or short-stopped | 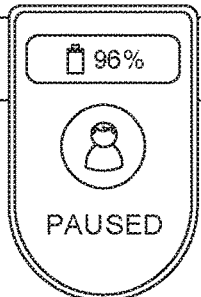 |
| Screen D | 100% | During trip - battery level above critical level. | 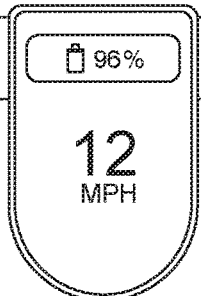 |
*Fig. 6A*

| Name | Brightness | When | Mock |
|---|---|---|---|
| Screen E | 100% | During trip – battery level critically low. | 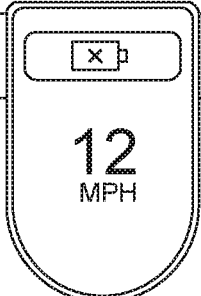 |
| Screen F | 100% | Scooter stopped for >10 sec (check with firmware team) | 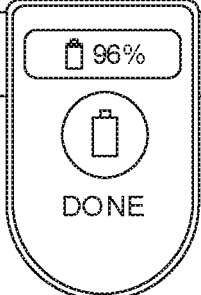 |
| Screen G | 100% | Scooter recently locked | 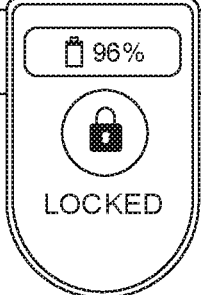 |
| Screen H | 100% | Charger plugged in | 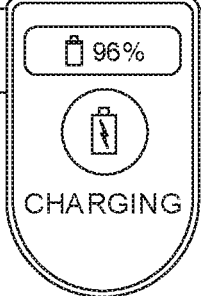 |
*Fig. 6B*

| Name | Brightness | When | Mock |
|---|---|---|---|
| Screen I | 100% | Error during trip | |
| Screen J1 | 100% | No parking zone: Scooter is in CCE zone | NO PARKING 0 MPH<br><br>French:<br><br>STATIONNEMENT INTERDIT 0 MPH |
| Screen J2 | 100% | No riding zone: Scooter is in CCE zone | NO RIDING 12 MPH |

Fig. 6C

| Name | Brightness | When | Mock |
|---|---|---|---|
| Screen J3 | 100% | Reduced speed zone: Scooter is in CCE zone | REDUCE SPEED<br>8 MPH |
| Screen K | 100% | Upgrading | 60%<br>UPGRADING |
| Screen L | 100% | CCU is disconnected from screen | Lime |

*Fig. 6D*

CREATING EASY-TO-UNDERSTAND INDICATIONS OF A VEHICLE STATE

CROSS-REFERENCE TO RELATED APPLICATIONS

This application claims priority to the U.S. provisional patent application Ser. No. 62/747,098 filed Oct. 17, 2018 which is incorporated herein by this reference in its entirety.

TECHNICAL FIELD

The present application is related to indications of a vehicle state, and more specifically to methods and systems that create easy-to-understand indications of the vehicle state.

BACKGROUND

Today, vehicles for rent, such as scooters, skateboards, bicycles, are becoming ubiquitous. The vehicles are parked on sidewalks and are available to passersby for rent. The passersby can rent a vehicle using their personal device such as a mobile phone. However, before engaging with the phone, starting the appropriate application, and selecting the vehicle, the user does not know if the vehicle is unavailable for rent for various reasons, such as the vehicle is broken, low battery, or in a "short-stop" state. Having to spend the time to perform the above-described actions just to be informed that the vehicle is unavailable can be a frustrating experience and may lead to users avoiding renting the vehicles. Even if the user rents a vehicle, the user may need to be reminded to take or not take certain actions regarding a vehicle state, such as to lock the vehicle after finishing a ride, or not to ride the vehicle in a parking area.

SUMMARY

Presented here is a system and method for creating easy-to-understand notifications of the vehicle state. The notification can be visual or can be auditory and can indicate to the user the vehicle state even when the user's attention is directed elsewhere. The indication can serve to attract the user's attention before more involved information is presented to the user, such as text, or the indication can serve to communicate to the user the vehicle state in an easy-to-understand way, such as using color-coded displays or audio indications. The intensity of the indication can be adjusted based on the likelihood that indication will be perceived by the user by, for example, measuring ambient light and/or ambient noise. Reducing the intensity of the indication conserves energy of an energy source associated with the vehicle.

BRIEF DESCRIPTION OF THE DRAWINGS

FIG. 5 shows a priority of vehicle states and indications signaling various vehicle states.
FIGS. 6A-6D show various displays and display intensities indicating various vehicle states.

DETAILED DESCRIPTION

Easy-to-Understand Indications of a Vehicle State

Presented here is a system and method for creating easy-to-understand notifications of the vehicle state. The notification can be visual or can be auditory and can indicate to the user the vehicle state even when the user's attention is directed elsewhere. The indication can serve to attract the user's attention before more involved information is presented to the user, such as text, or the indication can serve to communicate to the user the vehicle state in an easy-to-understand way such as using color-coded displays or audio indications. The intensity of the indication can be adjusted based on the likelihood that indication will be perceived by the user by, for example, measuring ambient light and/or ambient noise. Reducing the intensity of the indication conserves energy of an energy source associated with the vehicle.

Figure 1:
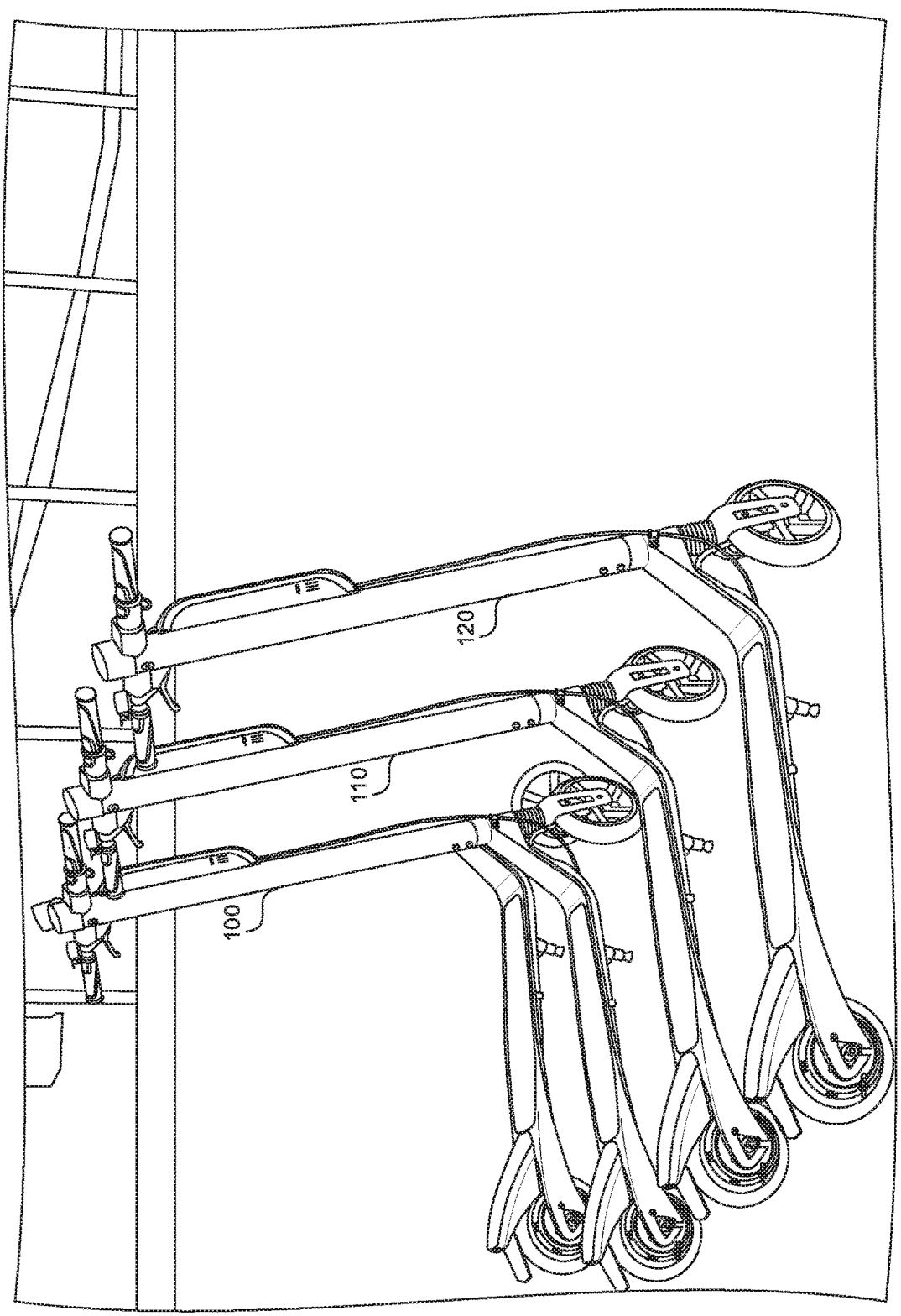
FIG. 1 shows multiple vehicles available to users.

FIG. 1 shows multiple vehicles available to users. The vehicles 100, 110, 120 (only 3 labeled for brevity) can be, for example, scooters, bikes, skateboards, roller skates, and/or cars. The vehicles 100, 110, 120 can be available to multiple users, such as nearby pedestrians or people using the vehicles 100, 110, 120. For example, the user can rent a vehicle 100, 110, 120 for a period of time.

Even though the vehicles 100, 110, 120 are parked next to each other, and apparently available for use, the vehicles 100, 110, 120 can be in one or more states, not all of which may be available for use to the users. For example, the vehicle 100 may be temporarily parked while waiting for the current user to return to the vehicle and continue the use of the vehicle. The vehicle 110 can be low on battery and waiting to be charged, thus unavailable for use. The vehicle 120 can be the only one available for use.

To prevent the user from wasting time and getting frustrated while trying to discover which of the vehicles 100, 110, 120 is available for rent, vehicles 100, 110, 120 can indicate to a user in an easy-to-understand manner whether the vehicle 100, 110, 120 is available.

Figure 2:
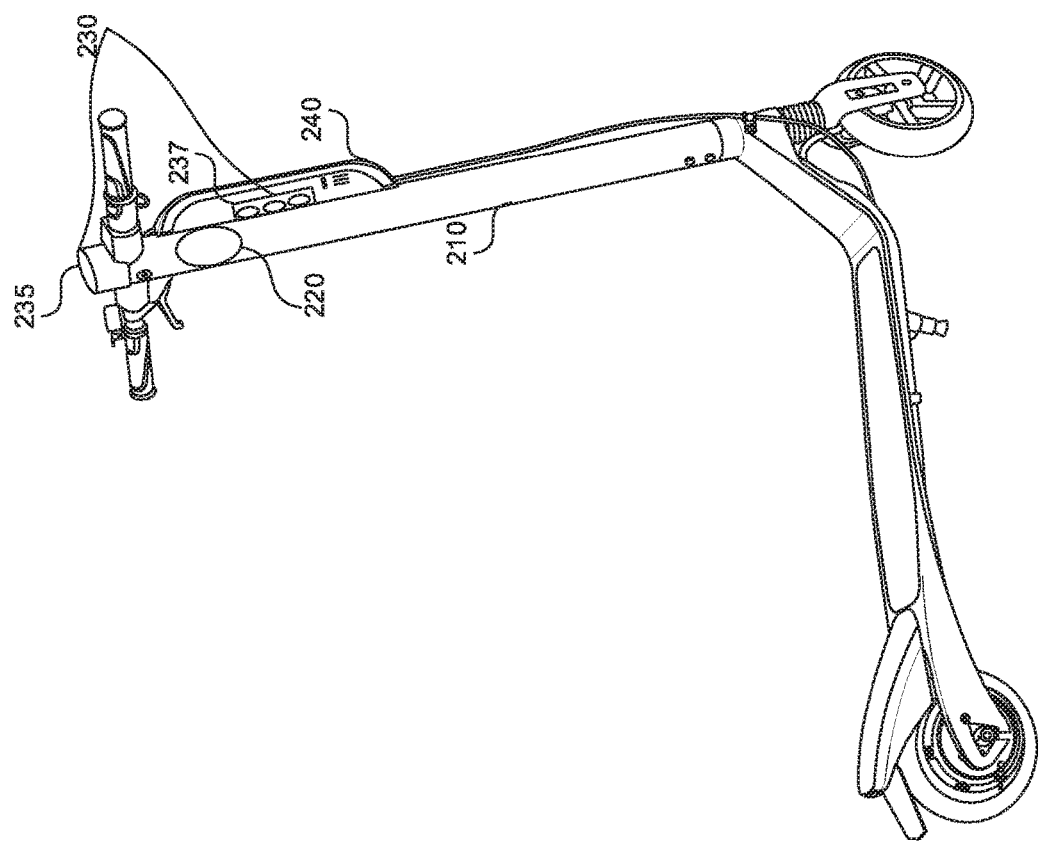
FIG. 2 shows an indicator of a state of a vehicle.

FIG. 2 shows an indicator of a state of a vehicle. The indicator 220, 230 can produce an indication of the state of the vehicle 210. The indication can be configured to be easily understood by a user. For example, the indication can be visual or can be auditory, and may not require the user to engage the use of another device such as a mobile device to interpret the meaning of the indication.

The vehicle 200 can include an audio emitter 220, i.e. a sound indicator, to produce the auditory indication. The indication can be a prerecorded voice message stating "available", or another word to that effect. The indication can also be musical.

The vehicle 200 can include a visual indicator 230, which can include a light emitting element such as a display screen 235 and/or light emitting diodes (LEDs) 237. The visual indicator 230 can be proximate to a light diffuser 240 scattering light emitted by the visual indicator 230. The light diffuser 240 can increase the visibility of the light over a wider area. The light diffuser 240 can receive light from the visual indicator 230 and can diffuse the received light to make the indication visible to a larger group of users. By scattering the light and making it visible over a wider area, the light diffuser 240 can decrease the amount of energy used by the visual indicator 230 when producing visible light.

Figure 3:
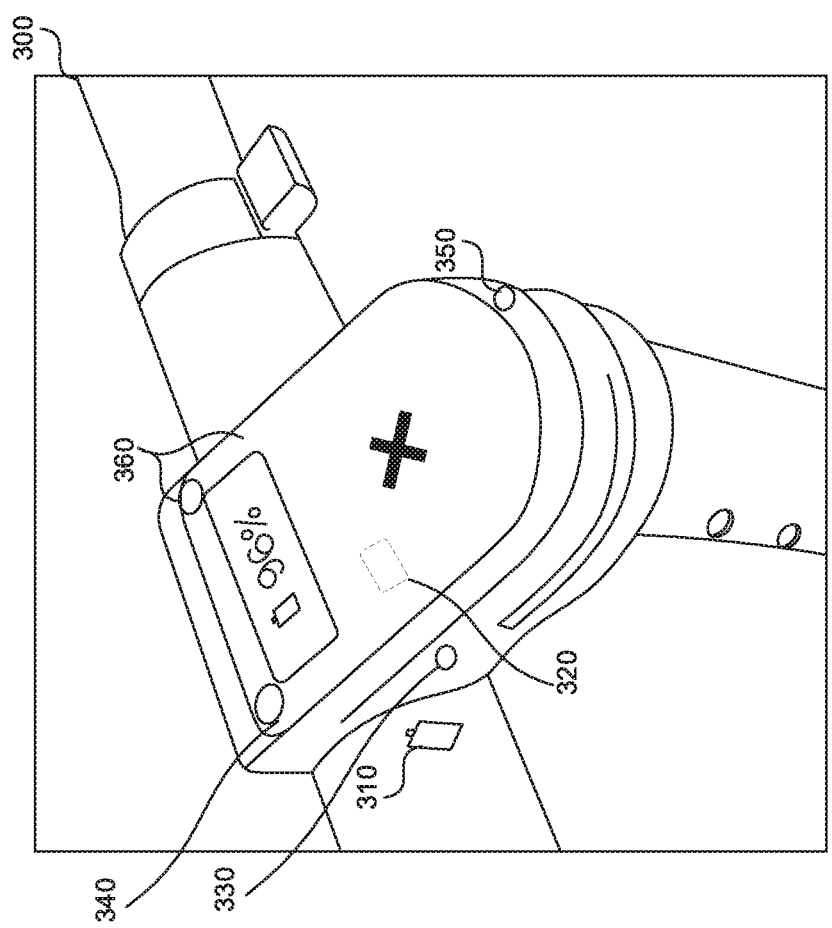
FIG. 3 shows additional components of a vehicle.

FIG. 3 shows additional components of a vehicle. The vehicle 300 can include additional components such as an energy source 310, a processor 320, a noise sensor 330, an ambient light sensor 340, and/or proximity sensor 350. The energy source 310 can be a battery, which can be charged in a wireless or a wired manner. The energy source 310 can power the indicator 360 and/or the vehicle 300. The energy consumed by the indicator 360 may not reduce the mobility range of the vehicle 300 by more than 2.5%. For example, the indicator 360 may not consume more than 2.5% of the energy during the operation of the vehicle 300. The energy source 310 can enable the indicator 360 to produce the indication of the state of the vehicle 300.

The processor 320 can reduce an energy consumption of the energy source associated with the indicator 360 by adjusting an intensity of the indication based on environmental factors such as ambient noise and/or ambient light.

For example, the indicator 360 can be an audio indicator, such as a speaker. The noise sensor 330, for example a microphone, can measure an amount of ambient noise. Based on the amount of ambient noise, the processor 320 can adjust the volume of the audio indicator 360 up or down. In a more specific example, if the environment is noisy, the processor 320 and can increase the volume of the audio indicator 360, while when the environment is quieter, the processor 320 can decrease the volume of the audio indicator 360.

In another example, the indicator 360 can be a visual indicator, such as a screen or a light emitting element. The ambient light sensor 340 can sense an ambient light surrounding the vehicle 300. The processor 320 can adjust the intensity of the indication by increasing the intensity or decreasing the intensity of the indication when the ambient light surrounding the vehicle has increased or decreased, respectively.

The vehicle 300 can include a proximity sensor 350 to sense a proximity of a user to the vehicle. The processor 320 can adjust the intensity of the indication based on the proximity of the user to the vehicle. The proximity sensor 350 can measure the distance to the user or the distance to the user's personal device, such as a phone.

In one example, the user can be a user who has already registered to rent the vehicle 300 and is looking for an available vehicle. The user can register to rent the vehicle 300 using a personal device, such as a cell phone.

In another example, the user can also be a user potentially interested in renting the vehicle, such as a nearby pedestrian. When the user is in the vicinity of the vehicle 300, the processor 320 can receive the distance measurement between the vehicle 300 and the user and can increase the intensity of the indication when the user is far away and can decrease the intensity of the indication as the user is approaching the vehicle 300. Increasing the intensity of the indication when the user is far away increases the likelihood that the user will perceive the indication, while decreasing the intensity of the indication when the user approaches can save the energy contained in the energy source 310.

The proximity sensor 350 can measure the distance to the users. The user can be a person who has already decided to rent the vehicle, or the user can be a person who may decide to rent the vehicle. When the users are far away from the vehicle 300, such as further than 3 m, the processor 320 can reduce the intensity of the indication, or completely turn it off. When a user approaches the vehicle 300, the processor can increase the intensity of the indication to make the indication perceptible to the user, who may be approaching the vehicle 300 because the user may be interested to rent the vehicle 300. Decreasing the intensity of the indication when the user is far away decreases the use of energy contained in the energy source 310 because the user who is far away is likely not interested in renting the vehicle. As the user approaches the vehicle 300, the likelihood that the user is interested in renting the vehicle 300 increases and increasing the intensity of the indication increases the likelihood that the user will perceive the indication and quickly understand the state of the vehicle 300.

Figure 4A:
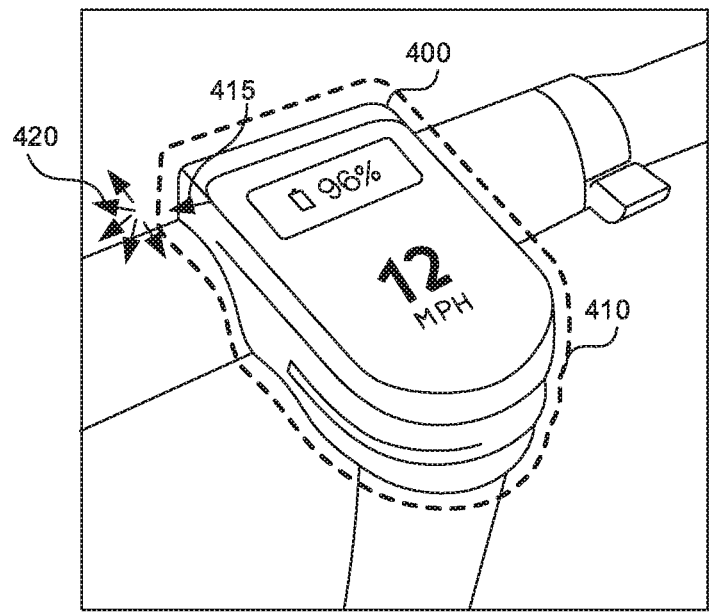
FIGS. 4A-4B show various visual indicators and light diffusers.
Figure 4B:
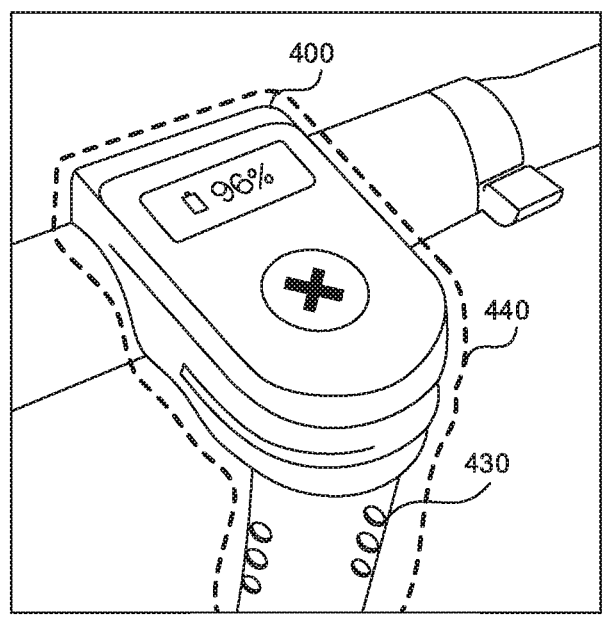

FIGS. 4A-4B show various visual indicators and light diffusers. A screen 400 can be a visual indicator. The screen 400, in addition to, or instead of displaying text can provide color coded indications to users.

The screen 400 can have a light diffuser 410 in FIG. 4A surrounding the screen 400. The light diffuser 410 can diffuse the color-coded indication produced by the screen 400 and can make the color-coded indication visible over a wider area. By scattering the light and making the light visible over a wider area, the light diffuser 410 can decrease the amount of energy used by the visual indicator 400 when producing visible light. The light diffuser 410 can be a polycarbon or an acrylic with at least a partially roughened surface designed to diffuse incoming light 415 in various directions 420, as shown in FIG. 4A. The partially roughened surface can be placed on the side of the screen 400 to avoid obscuring the display of the screen 400. The light diffuser 410 can also be a shaped lens, such as a concave lens, to further cause the divergence of incoming light rays 415.

In addition to the screen 400, separate light emitting elements 430 in FIG. 4B such as organic light emitting diodes (OLEDs) or light emitting diodes (LEDs) can create the visual indication. The light diffuser 440 in FIG. 4B can surround the handle bars of the vehicle to make the visual indication more noticeable. The light diffuser 440 can have a roughed surface over the area surrounding the screen 400.

FIG. 5 shows a priority of vehicle states and indications signaling various vehicle states. The vehicle 100, 110, 120 in FIG. 1, 210 in FIG. 2, 300 in FIG. 3 can have multiple states at once, such as the lock states shown in column 500, and other states shown in column 510. Column 520 references screens shown in FIGS. 6A-6D. Column 530 shows various indications. Indications can be animated, such as pulsing, as indicated in cells 540 or the indications can be static as indicated in cells 550. Indications can be color-coded as shown in column 530.

The state of the vehicle can depend on a location of the vehicle and a permission associated with the location of the vehicle. The custom city experience ("CCE") zones, shown in column 510, are areas designated by local government indicating vehicle permissions associated with the area. For example, the CCE zone can include a parking zone, a no parking zone, a riding zone, a no riding zone, a riding up to a speed limit zone, and/or a slow riding zone.

The vehicle 100, 110, 120, 210, 300 can determine its location and a permission associated with the location of the vehicle. The vehicle 100, 110, 120, 210, 300 can determine its location using various methods such as GPS, Wi-Fi positioning, cell tower positioning. The vehicle 100, 110,

120, 210, 300 can determine the permission of the location by receiving the permission over a network such as a cellular network, a Wi-Fi network, a mesh network, etc. The vehicle 100, 110, 120, 210, 300 can determine the vehicle's state, such as the speed of the vehicle, compare the state to the permission associated with the area, and determine whether the vehicle 100, 110, 120, 210, 300 is in violation of the permission.

Based on the determination, the vehicle 100, 110, 120, 210, 300 can produce an indication configured to be subconsciously understood by a user. For example, as shown in cell 550, the vehicle 100, 110, 120, 210, 300 can be stopped in a no parking zone. As a result, a pulsing yellow visual indicator can quickly communicate to the user that there is an issue with the vehicle location and CCE permissions. In addition to the pulsing yellow visual indicator, the screen J1 in FIG. 6C can provide further information about the issue by, for example, showing the CCE zone as well as the vehicle speed.

In another example, shown in cell 560, the vehicle 100, 110, 120, 210, 300 can be moving in a no riding zone. As a result, a pulsing yellow visual indicator can quickly communicate to the user that there is an issue with the vehicle location and the CCE permissions. In addition to the pulsing yellow visual indicator, the screen J2 in FIG. 6C can provide further information about the issue by, for example, showing the CCE zone as well as the vehicle speed.

In another example, shown in cell 570, the vehicle 100, 110, 120, 210, 300 can be moving over a speed limit. As a result, a pulsing yellow visual indicator can quickly communicate to the user that there is an issue with the vehicle location and the CCE permissions. In addition to the pulsing yellow visual indicator, the screen J3 in FIG. 6D can provide further information about the issue by, for example, showing the CCE zone as well as the vehicle speed.

As can be seen in column 510, a vehicle can be in multiple states at once. For example, in cell 580, the vehicle can have 6 states, namely, unlocked, hardware error, low battery, shortstop, CCE zone, stopped for more than 10 seconds. Among those multiple states a processor associated with the vehicle can determine one state on which to base the visual notification, shown in column 530. To determine the one state, the processor can retrieve a priority table, such as the one shown in FIG. 5.

When the vehicle is in the unlocked state, the priority table can indicate that the priorities in descending order are hardware error, low battery, shortstop, CCE zone, and duration of the shortstop. For example, in cell 580, the vehicle state that determines the indicator state is the hardware error, because the hardware error is the top priority state among the multiple states. Consequently, the indicator is pulsing red. Cell 590 represents a vehicle having the same states as cell 580, except for hardware error. In that case, low battery state is the topmost state as shown in FIG. 5, which determines that the indication should be pulsing yellow.

When the vehicle is in the locked state, the priority table can indicate that the priority list in descending order is over the air update ("OTA") in progress, charger plugged in, maintenance mode, low battery and duration of the locked state. For example, in cell 505, the vehicle is in multiple states, namely, locked, OTA in progress, charger plugged in, maintenance mode, locked for less than 5 seconds. The vehicle state that determines the indicator state is the OTA in progress, because the OTA in progress is the top priority state among the multiple states. Cell 515 represents a vehicle having the same states as cell 580, except for OTA in progress. Consequently, the indicator is pulsing red. In that case, charger plugged in is the topmost state as shown in FIG. 5, which determines that the indication should be pulsing yellow.

The indication can serve to attract the user's attention before more involved information is presented to the user, such as text, or the indication can serve to communicate to the user the vehicle state in an easy-to-understand way such as using color-coded displays or audio indications. For example, a solid green light, as shown in row 525, can indicate to the user in an easy-to-understand way that the vehicle is available for rent. The user is not required to engage a personal device to discover that the vehicle is available for rent. Instead, the user can subconsciously understand the solid green light to mean that the vehicle is available. In another example, as shown in rows 535, 545, 555, a pulsing yellow light can attract the user's attention while the user is riding. The pulsing yellow light can inform the user that the vehicle state needs attention and/or there is a discrepancy between the vehicle state and the environment. Once the user focuses the attention on the indicator, such as the display screen, screens J1, J2, J3 in FIGS. 6C-6D can provide additional information about the state of the vehicle, such as riding in a parking zone, riding over the speed limit, and/or being parked in a no parking zone.

FIGS. 6A-6D show various displays and display intensities indicating various vehicle states. Column 600 shows an intensity of an indicator, in this case the display screen. The intensity of the indicator, such as brightness of the display screen, can be adjusted depending on the state of the vehicle, and/or environment surrounding the vehicle. Column 610 shows the state of the vehicle, while column 620 shows the vehicle screen displaying a message.

Rows 630, 640 show two instances in which the intensity of the display screen can be reduced to preserve energy. In row 630, the brightness of the screen can be reduced to 10% of full brightness because the vehicle is not engaged, there is no user needing to read the screen, and/or there are no users in vicinity of the vehicle. The brightness of the screen can increase, even when the vehicle is in the state described in row 630, if there is a user near the vehicle, as described in this application. Row 640 shows that the brightness of the screen can be reduced, for example to 10% of the total brightness, when the vehicle is in maintenance mode or has low energy.

Row 650 in FIG. 6C shows a message displayed when the scooter is in a no parking CCE zone. The message can be displayed in a language appropriate to the location of the scooter. The scooter can determine its geographic location and a language associated with the geographic location and display the message in the appropriate language, such as French as shown in row 650.

The screen shown in column 620, at full brightness, can draw 150 mA at 5 V from the energy source of the vehicle. When the screen is fully off, the screen can draw 60 mA at 5 V from the energy source of the vehicle. The screen shown in column 620 in FIGS. 6A-6D are examples of messages that the screen can display. The screen can also display animations, such as animated messages. In addition, the screen can display:

- Turn by turn navigation.
- Turning signal indication.
- Display vehicle statistics after ride (e.g. amount of time used, distance traveled, remaining charge, et.)
- In trip push notifications to the display screen, and/or to the mobile application on user's phone.
- CCE Zone based labels during trip.
- Audio notifications (voice or series of sounds)

Sponsorship/advertisements by third parties:
"Powered by [Company X] when the scooter is unlocked or locked,
"There is a coffee shop [Company Y] to your right".
Digital QR code of the vehicle.

Further, the screen display can be customized. For example, the screen can display the user's name with a greeting for a few seconds upon the user's beginning to use the vehicle. In another example, the colors displayed on the screen signifying various states of the vehicle can be customized by a user using an interface on the vehicle screen, and/or an interface on a device interacting with the vehicle.

Figure 7:
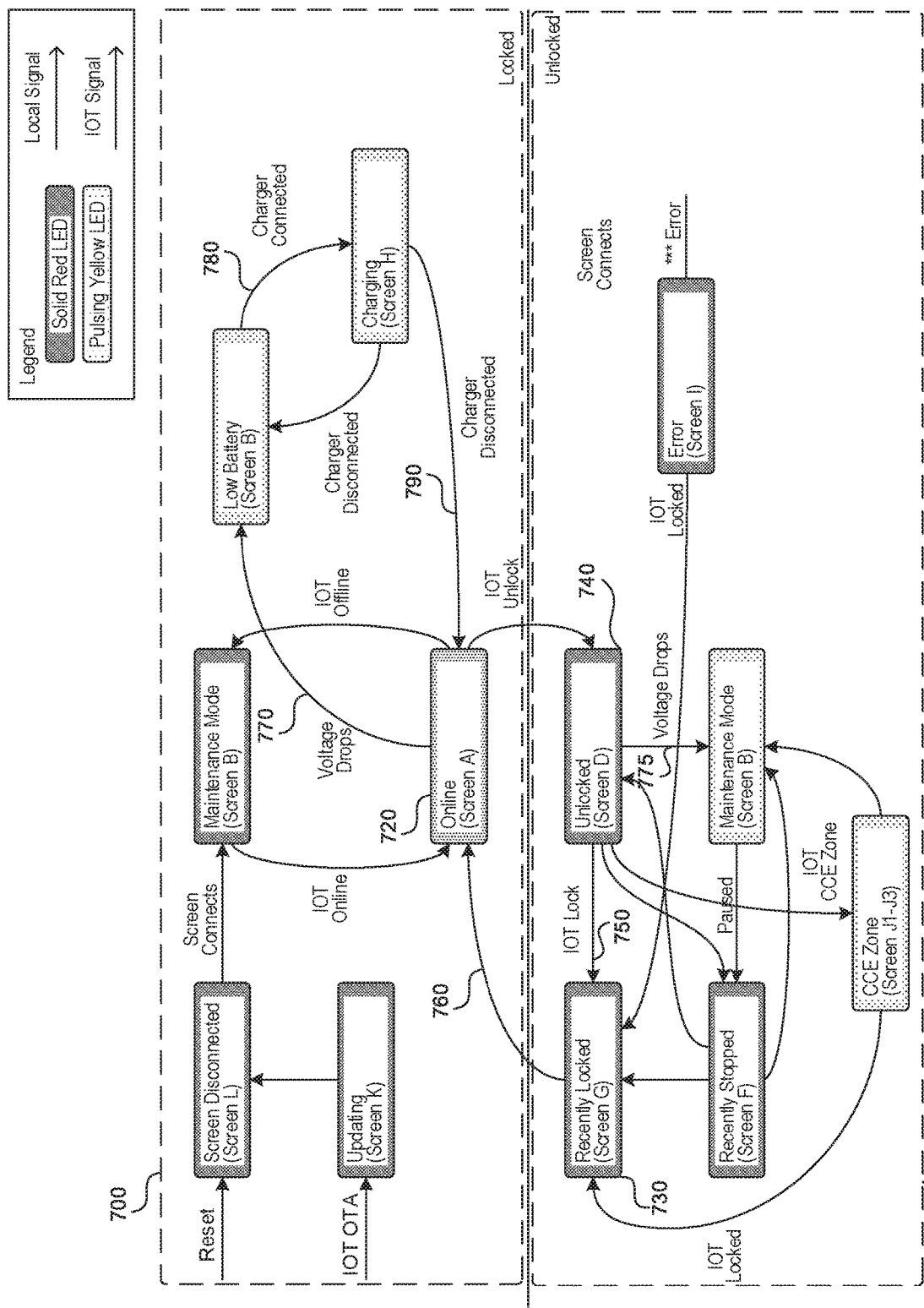
FIG. 7 shows a state machine of the vehicle.

FIG. 7 shows a state machine of the vehicle. The vehicle can communicate with a server using an Internet of things (JOT) protocol. Vehicle states contained in the area 700 can represent unlocked states, while vehicle states contained in the area 710 can represent locked states. The vehicle can transition between states, such as states 720, 730, 740 upon receiving an IOT message 750 (only one labeled for brevity), or upon detecting a change in the local environment such as passage of time, represented by transition 760, a voltage drop 770, 775 and/or connecting or disconnecting of chargers 780, 790. Hardware associated with the vehicle can detect a change in the local environment using a device such as a clock, a voltmeter, and/or ampere meter. The screen labels in FIG. 7 refer to the screen labels in FIGS. 6A-6D.

Figure 8:
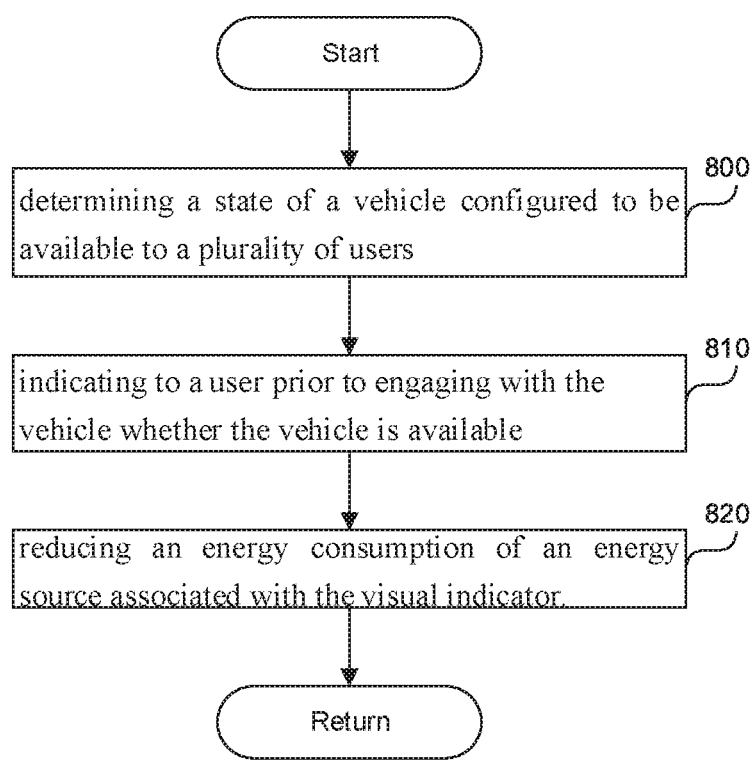
FIG. 8 is a flowchart of a method to indicate to a user whether the vehicle is available, prior to the user engaging with the vehicle.

FIG. 8 is a flowchart of a method to indicate to a user whether the vehicle is available, prior to the user engaging with the vehicle. In step 800, a processor associated with a vehicle 100, 110, 120 in FIG. 1, 210 in FIG. 2, 300 in FIG. 3 can determine a state of the vehicle 100, 110, 120, 210, 300. The vehicle 100, 110, 120, 210, 300 can be available to multiple users, depending on the vehicle's state. The state of the vehicle can include available for use and unavailable for use, and other states, such as the states shown in FIG. 5.

In step 810, the processor can indicate, using a visual indicator associated with the vehicle, to a user among the multiple users prior to engaging with the vehicle whether the vehicle is available by producing a visual indication. The users can be nearby pedestrians. The visual indication can be subconsciously understood by the user. For example, the visual indication can be a color, a color-coded message, an animation, etc., indicating to the user whether the vehicle is available for rent or not. A vehicle that is not available for rent can be broken, can have low battery, and/or can be in a "short-stop" state. Providing an easy-to-understand visual indication can communicate to the user the availability of the vehicle before the user uses a personal device to scan the vehicle. The easy-to-understand visual indication is a more efficient way to communicate the vehicle states to the user.

In step 820, the processor can reduce an energy consumption of an energy source associated with the visual indicator by determining a detectability of the visual indication to the user and adjusting an intensity of the visual indication based on detectability of the indication to the user. As described in this application, the stability of the visual indication can be based on distance to the user, and other environmental factors such as amount of energy associated with the vehicle, ambient light, ambient noise, etc.

Figure 9:
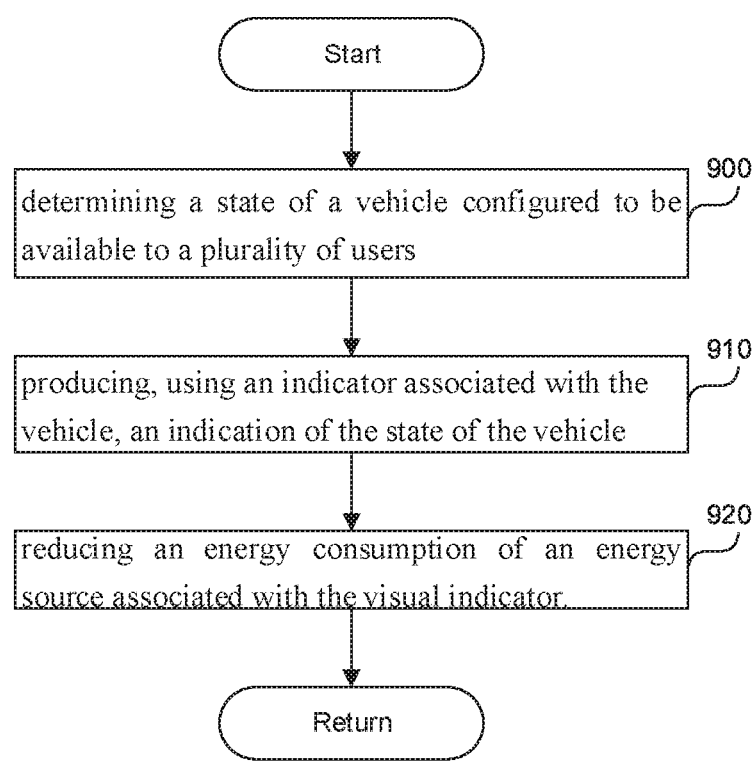
FIG. 9 is a flowchart of a method to indicate a state of the vehicle to user in an easy-to-understand manner.

FIG. 9 is a flowchart of a method to indicate a state of the vehicle to a user in an easy-to-understand manner. In step 900, a processor associated with the vehicle 100, 110, 120 in FIG. 1, 210 in FIG. 2, 300 and FIG. 3, can determine a state of a vehicle configured to be available to multiple users. The vehicle can be a scooter, a bicycle, a skateboard, a motorcycle, a drone, a car, rollerskates, etc.

The state of the vehicle can include available for use and unavailable for use, locked, unlocked, riding, parked, charging, maintenance and other states shown in FIG. 5. The state of the vehicle can be defined by the phase of the ride or by the CCE zone. The state of the vehicle can depend on a phase of a ride such as before the ride, during the ride, and after the ride. The state of the vehicle can also depend on a location of the vehicle and a permission associated with the location of the vehicle.

For example, the vehicle can have the following indication depending on the phase of the ride and the CCE zone.
Before the ride:
Vehicle operational and ready for a trip:
Solid green.
Vehicle not-operational:
Vehicle in maintenance mode:
Solid red.
OTA update in progress:
Pulsing red.
Vehicle low battery:
Solid yellow.
Vehicle reserved or paused in-ride:
Pulsing green.
Vehicle charging:
Pulsing yellow.
In-ride:
Battery level above critical: pulsing green.
Battery level below critical: pulsing yellow.
Error encountered during ride: pulsing red.
Vehicle enters CCE zone: example: a
The technology can incorporate CCE (custom city experience) zones based on a vehicle company's collaboration with cities or based on existing city regulations. New zone types with custom icons can be shown on the display interface, as new zone types and areas are being defined.
No parking zone: pulsing yellow.
No riding zone: pulsing yellow.
Slow zone: pulsing yellow.
End-ride:
Pulsing green until locking is completed.
Refer to "Before the ride" for status after locking complete.

The vehicle can be in multiple states at the same time. When the vehicle is in multiple states at the same time, the processor can obtain a specification of a priority associated with the multiple states. The processor can produce the indication based on the multiple states and the specification of the priority. Specification of priority can be as shown in and explained in relation to FIG. 5.

In step 910, the processor can produce an indication of the state of the vehicle using an indicator associated with the vehicle. The indication, such as a visual or an auditory indication, can be perceived by the user, even when the user is focused elsewhere. The indication can also be subconsciously understood by a user without requiring a user action such as reading a message or engaging with the vehicle. Indication can be color-coded, as shown in FIGS. 5, 6A-6D. The indication can be animated, for example, the indication can pulse when the indication is important and needs to grab the user's attention. The indication can be perceived using peripheral vision or can be perceived through hearing, thus communicating to the user, even when the user's attention is focused elsewhere.

For example, the indication that the vehicle is unavailable can be provided to the user prior to the user's attempting to use the vehicle, only to discover that the vehicle cannot be rented, causing frustration to the user. In another example, the indication can signify to the user that the user is riding the vehicle in a parking zone. In a third example, the indication can signify to the user, after the user has finished a ride, that the state of the vehicle is unlocked, thereby indicating to the user to lock the vehicle.

In a fourth for example, the processor can determine a location of the vehicle and a permission associated with the location of the vehicle. As explained in this application, permission can be permission to park, to ride, to drive up to a speed limit, etc. The processor can determine whether the vehicle is in violation of the permission using one of the sensors associated with the vehicle such as a speedometer. Based on the permission and the speed of the vehicle, the processor can produce the indication that the vehicle is in violation of the permission.

In step 920, the processor can reduce energy consumption of an energy source associated with the indicator by adjusting an intensity of the indication based on a detectability of the indication to the user. For example, the processor can determine an amplitude of the ambient noise and adjust the auditory indication relative to the amplitude of the ambient noise.

In another example, the processor can determine an ambient light surrounding the vehicle, proximity of a user, or an importance of the indication. The proximity sensor can measure the distance to the user, or the distance to a personal device associated with the user. The processor can decrease the intensity of the indication when the ambient light surrounding the vehicle is low, when the user is close to the vehicle, or when the importance of indication is low. The importance of the indication can be determined using the priority table shown in FIG. 5.

Computer

Figure 10:
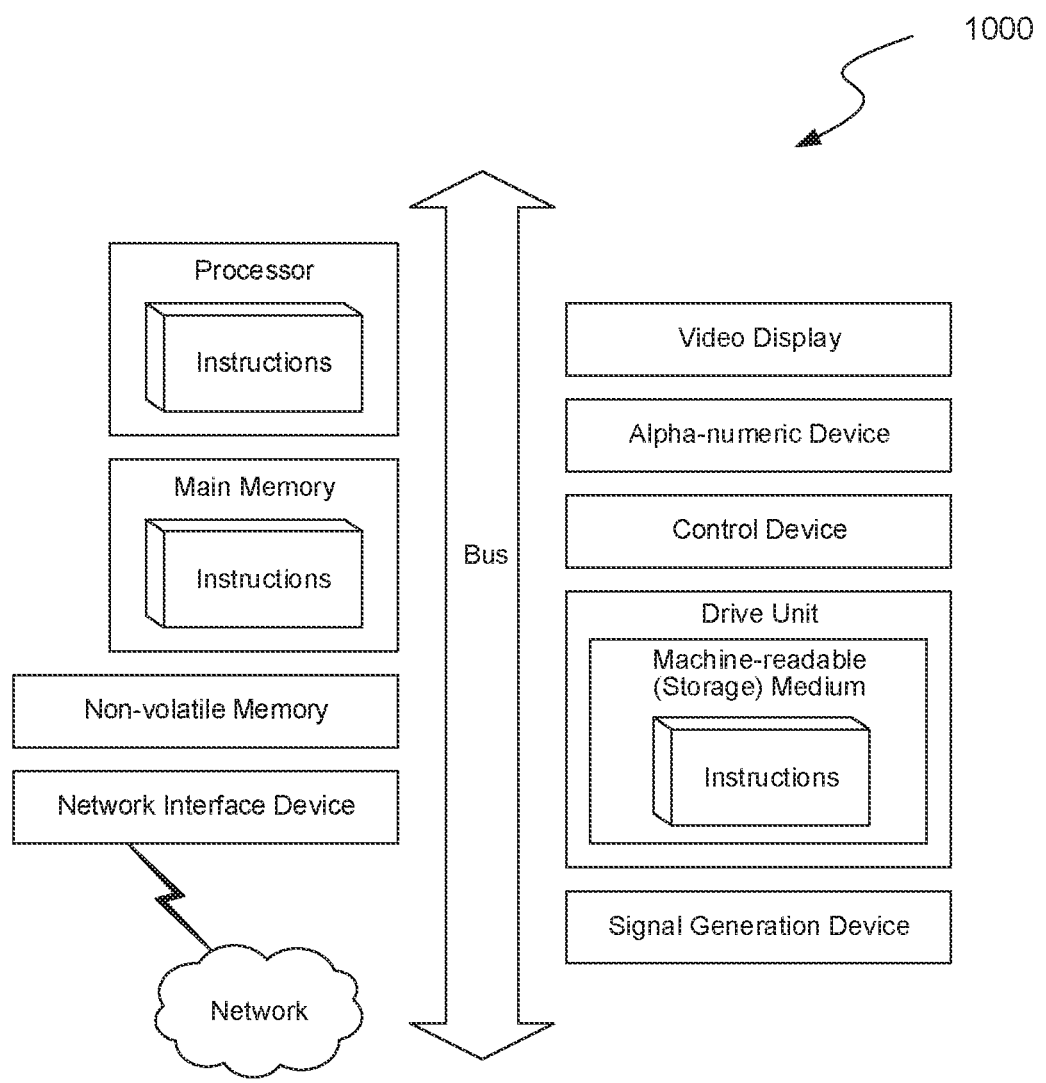
FIG. 10 is a diagrammatic representation of a machine in the example form of a computer system 1000 within which a set of instructions, for causing the machine to perform any one or more of the methodologies or modules discussed herein, may be executed.

FIG. 10 is a diagrammatic representation of a machine in the example form of a computer system 1000 within which a set of instructions, for causing the machine to perform any one or more of the methodologies or modules discussed herein, may be executed.

In the example of FIG. 10, the computer system 1000 includes a processor, memory, non-volatile memory, and an interface device. Various common components (e.g., cache memory) are omitted for illustrative simplicity. The computer system 1000 is intended to illustrate a hardware device on which any of the components described in the example of FIGS. 1-9 (and any other components described in this specification) can be implemented. The computer system 1000 can be of any applicable known or convenient type. The components of the computer system 1000 can be coupled together via a bus or through some other known or convenient device.

The processor of the computer system 1000 can be the processor performing various steps described in this application, such as steps described in FIGS. 8, 9. The video display of the computer system 1000 can be the visual indicator associated with the vehicle 100, 110, 120 in FIG. 1, 210 in FIG. 2, 300 in FIG. 3. The network interface of the computer system 1000 can be used for communicating between the vehicle 100, 110, 120, 210, 300 and remote server using the IOT protocol. The signal generation device of the computer system 1000 can be the audio indicator associated with the vehicle 100, 110, 120, 210, 300. The main memory, the non-volatile memory, and/or the drive unit can store instructions to be executed by the processor of the computer system 1000.

This disclosure contemplates the computer system 1000 taking any suitable physical form. As example and not by way of limitation, computer system 1000 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a useral digital assistant (PDA), a server, or a combination of two or more of these. Where appropriate, computer system 1000 may include one or more computer systems 1000; be unitary or distributed; span multiple locations; span multiple machines; or reside in a cloud, which may include one or more cloud components in one or more networks. Where appropriate, one or more computer systems 1000 may perform without substantial spatial or temporal limitation one or more steps of one or more methods described or illustrated herein. As an example and not by way of limitation, one or more computer systems 1000 may perform in real time or in batch mode one or more steps of one or more methods described or illustrated herein. One or more computer systems 1000 may perform at different times or at different locations one or more steps of one or more methods described or illustrated herein, where appropriate.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 1000. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, storing and entire large program in memory may not even be possible. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system 1000. The interface can include an analog modem, isdn modem, cable modem, token ring interface, satellite transmission interface (e.g. "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 10 reside in the interface.

In operation, the computer system 1000 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux™ operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a useral computer (PC), a tablet PC, a laptop computer, a set-top box (STB), a useral digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies or modules of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

Remarks

The language used in the specification has been principally selected for readability and instructional purposes, and it may not have been selected to delineate or circumscribe the inventive subject matter. It is therefore intended that the scope of the invention be limited not by this Detailed Description, but rather by any claims that issue on an application based hereon. Accordingly, the disclosure of various embodiments is intended to be illustrative, but not limiting, of the scope of the embodiments, which is set forth in the following claims.

The invention claimed is:

1. A vehicle configured to be available to a plurality of users, the vehicle having a state comprising available for use and unavailable for use; the vehicle comprising:
   a visual indicator attached to the vehicle producing a visual notification of the state of the vehicle being available to rent;
   an energy source associated with the visual indicator to enable the visual indicator to produce the visual notification of the state of the vehicle; and
   a processor to reduce an energy consumption of the energy source associated with the indicator by reducing an intensity of the visual notification based on a user being less than a predetermined distance from the vehicle.

2. The vehicle of claim 1, the state of the vehicle depends on a location of the vehicle and a permission associated with the location of the vehicle.

3. The vehicle of claim 1, further comprising:
   a proximity sensor to sense a proximity of the user to the vehicle; and
   the processor to adjust the intensity of the indication by increasing the intensity or decreasing the intensity of the indication based on the proximity of the user to the vehicle.

4. A method of providing a vehicle status to a user, the method comprising:
   providing a vehicle configured to be available to a plurality of users;
   wherein the vehicle comprises:
   a visual indicator to provide visual notifications of a state of the vehicle being available to rent;
   an energy source associated with the visual indicator to enable the visual indicator to produce a visual notification of the state of the vehicle; and
   a processor to reduce an energy consumption of the energy source associated with the indicator by adjusting an intensity of the indication based a user being less than a predetermined distance from the vehicle.

5. The method of providing a vehicle status to a user of claim 4, wherein the notification comprises a color coding indication.

6. The method of providing a vehicle status to a user of claim 4, wherein the state of the vehicle is selected from the group consisting of available for use, unavailable for use, locked, unlocked, riding, parked, charging, a maintenance state, and a custom city experience (CCE) zone state.

7. The method of providing a vehicle status to a user of claim 4, wherein the vehicle is a scooter, a bicycle, a skateboard, or a motorcycle.

8. The method of providing a vehicle status to a user of claim 4, wherein the visual indicator further indicating to the user that the state of the vehicle is unlocked, thereby indicating to the user to lock the vehicle.

9. The method of providing a vehicle status to a user of claim 4, wherein the vehicle further comprises a proximity sensor to measure the distance of the vehicle from the user's personal device.

* * * * *